United States Patent
Kenington et al.

(10) Patent No.: US 8,433,260 B2
(45) Date of Patent: Apr. 30, 2013

(54) BASE-STATION FAILURE PREDICTOR

(75) Inventors: Peter Kenington, Chepstow (GB); Eric Westberg, Ulm (DE)

(73) Assignee: Ubidyne Inc., Wilmington, DE (US)

( * ) Notice: Subject to any disclaimer, the term of this patent is extended or adjusted under 35 U.S.C. 154(b) by 875 days.

(21) Appl. No.: 12/551,947

(22) Filed: Sep. 1, 2009

(65) Prior Publication Data

US 2011/0053530 A1    Mar. 3, 2011

(51) Int. Cl.
 *H03C 1/62*    (2006.01)
 *H04B 17/00*   (2006.01)

(52) U.S. Cl.
 USPC ............... 455/115.4; 455/561; 714/48

(58) Field of Classification Search ............... 455/115.1, 455/115.4, 550.1, 561; 714/25, 46, 48
 See application file for complete search history.

(56) References Cited

U.S. PATENT DOCUMENTS

| | | | | |
|---|---|---|---|---|
| 6,501,735 | B1 * | 12/2002 | Han ............................. | 370/242 |
| 7,827,446 | B2 * | 11/2010 | Kimura et al. .................. | 714/43 |
| 2006/0158225 | A1 | 7/2006 | Stojanovic et al. | |
| 2007/0153884 | A1 | 7/2007 | Balasubramanian et al. | |
| 2010/0073051 | A1 | 3/2010 | Rao et al. | |

FOREIGN PATENT DOCUMENTS

| CA | 2571385 | 6/2008 |
|---|---|---|
| JP | 2003057273 | 2/2003 |

* cited by examiner

*Primary Examiner* — Nhan Le

(57) ABSTRACT

A base-station failure predictor comprises an interface to at least one sub-unit of a base-station of a mobile communications network, an alarm memory, and an alarm evaluator. The base-station failure predictor is adapted to receive a plurality of alarms from the at least one sub-unit of the base-station via the interface. The plurality of alarms are stored in the alarm memory, and the alarm evaluator is adapted to analyze the frequency of the plurality of alarms to assess a likelihood of failure of the at least one sub-unit concerned. A base-station failure prediction method is also proposed. Furthermore, a computer program product with instructions for the manufacture and a computer program product enabling a processor to carry out the base-station prediction method are also proposed.

10 Claims, 5 Drawing Sheets

| DIAGNOSTIC INDICATOR ID | TIME STAMP | ORIG. | TYPE |
|---|---|---|---|
| 1232 | 07:32 AM | RRH1 | IMD |
| 1233 | 07:57 AM | RRH1 | IMD |
| 1234 | 08:06 AM | PWR | HEAT |
| 1235 | 08:14 AM | RRH1 | IMD |

BASE-STATION FAILURE PREDICTOR

CROSS REFERENCE TO OTHER APPLICATIONS

The present application is related to U.S. patent application Ser. No. 12/551,961, filed Sep. 1, 2009. The entire disclosure of the foregoing application is incorporated herein by reference.

FIELD OF THE INVENTION

The field of the present invention relates to a base-station failure predictor, for example for use in a base-station used in mobile communications networks. The field of the present invention further relates to a base-station failure prediction method. The field of the present invention also relates to a computer program product enabling a foundry to carry out the manufacture of the base-station failure predictor and to a computer program product enabling a processor to carry out the base-station failure prediction method.

BACKGROUND OF THE INVENTION

In a base-station installation, it is useful to be able to predict failures before they occur, since this allows replacements or repairs to be carried out at scheduled maintenance visits or, in the case of an antenna-embedded radio product, at times when the site is down anyway (perhaps because another sharer of the site needs to undertake an antenna swap, for example). It is often of interest for the network operator to be able to control the time at which the maintenance is performed. It is expected that this would result in improved reliability of service for the user and a lower cost of ownership for the network operator.

A base transceiver station, or base-station, in general has the following units: A transceiver (TRX), a power amplifier (PA), a combiner, a duplexer, an antenna, an alarm extension system, a control function and a base band receiver unit (BBxx). The alarm extension system connects working status alarms of various units in the base-station and extends them to operations and maintenance (O&M) monitoring stations. Most of the units of the base-station have a self-diagnostic ability that allows the units to issue diagnostic indicators, such as alarms to the alarm extension system. The alarm extension system may report the diagnostic indicators (alarms) received from the unit to a central office, or the alarm extension system may store the diagnostic indicators (alarms) to be presented to a maintenance technician during a maintenance intervention. The personnel of the central office or the maintenance technician may then evaluate the reported diagnostic indicators (alarms) and decide on which maintenance and/or repair actions need to be performed. In some cases, the base-station itself processes the diagnostic indicators (alarms) and provides an indication as to whether a repair or replacement is needed, thereby 'de-skilling' the role of the central office personnel and also that of the maintenance technician.

SUMMARY OF THE INVENTION

The inventor of the present invention has observed that some diagnostic indicators appear to be related to each other, that is the diagnostic indicators are not independent from each other in a statistical sense. The clustered occurrence of several low priority diagnostic indicators may indeed hint to a larger underlying problem (or the likelihood of such a problem developing in the foreseeable future). In other words, observing a group of diagnostic indicators together and relating the diagnostic indicators to each other can provide superior results to that of an isolated analysis of individual diagnostic indicators.

It would be desirable to improve base-station failure prediction so that the base-station operator gets an early warning when the base-station begins to have problems. This would also give the base-station operators a wider choice of actions and increased flexibility when planning maintenance interventions for the base-station. A base-station failure predictor is proposed that comprises an interface to at least one sub-unit of the base-station, a diagnostic indicator memory, and a diagnostic indicator evaluator. The base-station failure predictor is adapted to receive, during a certain time span, a plurality of diagnostic indicators from the at least one sub-unit of the base-station via the interface. The plurality of diagnostic indicators are stored in the diagnostic indicator memory and the diagnostic indicator evaluator is adapted to analyze a frequency of the plurality of diagnostic indicators to assess a likelihood of failure of the at least one sub-unit concerned.

The base-station failure predictor may provide failure prediction capabilities which receive the diagnostic indicators from one or more sub-units of the base-station and relating the diagnostic indicators to each other. It is usually not necessary to modify the sub-units. The time of occurrence and the origin of each one of the diagnostic indicators provide additional information to the base-station failure predictor. The term "failure" in this disclosure is also intended to include a breach of key specification parameters. The term "diagnostic indicator" in this disclosure is intended to include alarms and warnings. Warnings are diagnostic indicators which are not predicated by a failure, necessarily, but indicate that a particular parameter is operating outside its normal range. For example, a temperature warning might indicate that a unit (or a part thereof) is operating at a higher temperature than would be expected in normal circumstances. Such a warning would be distinct from an "over-temperature" alarm, which generally indicates a failure or the imminent danger of a failure and which will result in the unit (or a sub-unit) shutting down (either of its own volition or under instructions from the remainder of the base-station).

Some of the sub-units present in the base-station may have self-diagnostic capabilities. These self-diagnostic capabilities cause the sub-units to reset themselves and/or to send corresponding messages to a central entity, such as a failure management system of the base-station. Incidents reported via the sub-units may have different levels of severity, ranging from minor problems that should be attended to during the next scheduled maintenance, to highly severe failures that cause the sub-unit to cease operation, perhaps even immediately.

It may be a reasonable assumption to consider that the incidents reported from particular ones of the sub-units to be correlated with each other and not statistically independent. The present disclosure is based on the assumption of correlated incidents of several sub-units. Obviously other assumptions may prove reasonable as well. If the frequency of a diagnostic indicator reported from a certain sub-unit increases, this increased frequency may mean that the sub-unit is not operating optimally, even though each individual diagnostic indicator on its own is not very severe. The base-station failure predictor described herein comprises a diagnostic indicator memory which enables the failure predictor to look back over a certain period in time in order to retrieve historical diagnostic indicator data. The historical diagnostic indicator data may then be used for an analysis of the frequency of a certain type of diagnostic indicator, or even a combination of different types of diagnostic indicators.

The diagnostic indicator evaluator may be adapted to analyze the type of the diagnostic indicator. Some of the sub-units issue different types of the diagnostic indicators depending on different diagnostic findings within the sub-unit. Furthermore, the sub-unit originating the diagnostic indicator may also issue a parameter for determining the type of diagnostic indicator. The diagnostic indicator type determination may allow the base-station failure predictor to perform a more accurate analysis of the state of the base-station and of its sub-units. The capability of the diagnostic indicator evaluator to analyze the type of diagnostic indicator may improve the sensitivity of the base-station failure predictor. Analysing the type of diagnostic indicator may allow to differentiate between different types of diagnostic indicator, and thus between potentially different reasons for failure within a single sub-unit.

It would be further desirable to be able to detect complex or interrelated problems that may exist within the base-station, possibly distributed among several ones of the sub-units. This concern may be addressed by a feature according to which the diagnostic indicator evaluator is adapted to analyze a combination of the diagnostic indicators to assess the likelihood of failure. In a highly inter-connected system such as the base-station, a malfunction within one of the sub-units may have a side effect on other ones of the sub-units. Sometimes, two or more of the diagnostic indicators may be related to each other. This might even be true for the diagnostic indicators that originate from different ones of the sub-units. The reasons for this relationship can be many-fold, such as spatial, functional, or structural proximity of the sub-units that are involved.

The combination of the diagnostic indicators may be a weighted combination or a weighted sum. The diagnostic indicator evaluator is adapted to use the weighted combination for providing an indication of the likelihood of failure within a given time period or an indication that the sub-unit requires service or replacement prior to an actual failure. This measure may improve the response time for servicing or replacing the sub-units. A 'weighted-sum' of diagnostic indicators and their severity may be useful to predict a likely failure. For example, a large number of minor diagnostic indicators may indicate a general level of poor 'health' of the unit (and hence the operator may want to replace it), despite each diagnostic indicator individually being inconsequential. Each diagnostic indicator can be assigned an importance and a sum of diagnostic indicator frequency x importance (or diagnostic indicator presence x importance, where an diagnostic indicator is continuous) for each diagnostic indicator or warning present can provide an overall numerical representation of the 'health' of the system.

The base-station operator may have collected a number of typical failure cases. The failure cases may be combined with instructions to the central office personnel or the maintenance technician on how a certain failure case should be dealt with. For example, these failure cases may comprise an actual reason for a failure, a diagnostic indicator pattern, and recommended actions to be performed by the central office personnel or a maintenance technician. The actual reason of the failure is sometimes difficult to detect during operation and therefore often unknown. However, it may be possible to identify the reason later during a detailed examination of the sub-unit that has failed. The diagnostic indicator pattern is often detectable by the base-station failure predictor. The failure cases may be stored in a data base and incoming ones of the diagnostic indicators may be checked against these failure cases. As a result, the maintenance technician may receive a complete task assignment at his email account or on a personal digital assistant (PDA), for example. The assignment of the task to a particular maintenance technician may be based on a geographical region and/or a certain technical domain to which the maintenance technician is assigned. The weighted combination may account for the elapsed time between two similar or identical diagnostic indicators or the origin of the alarm.

The diagnostic indicator evaluator may be adapted to establish a long-term trend in the diagnostic indicators. Some failures in the sub-units of the base-station evolve only very slowly. Failures related to an aging of components of the sub-units may occur gradually over time. Sometimes the age-related failures have a long prehistory. These types of age-related failures and possibly other types of failures as well, may be detected by means of an analysis of a long-term trend in the diagnostic indicators revealing slow changes in the base-station's behaviour. It may indicate an imminent failure, if the long-term trend shows characteristics (frequency, severity, etc.) of a certain type of diagnostic indicator changed recently. At least, it may be reported so that further investigations may be undertaken.

It would be desirable to know to which extent the base-station is observed by the base-station failure predictor, and whether there are any "blind spots". This concern and/or possibly other concerns are addressed by the base-station failure predictor further comprising a coverage assessment module adapted to quantize a percentage of the base-station which is supervised by the base-station failure predictor. The coverage assessment module may be adapted to analyze one or more origins of the diagnostic indicators and to compare the origin(s) with a list of the sub-units to be supervised by the base-station failure predictor. The various ones of the sub-units may be programmed so that the sub-units issue a status message at predetermined intervals. The status message may allow the coverage assessment module to determine which ones of the sub-units are adapted and/or configured to notify the diagnostic indicator to the base-station failure predictor. The list of the sub-units to be monitored may represent a reference for the completeness of coverage. The coverage assessment module may determine the ratio between the number of the sub-units that are actually cooperating and the number of the sub-units to be monitored. The coverage assessment module may communicate the determined ratio (i.e. the coverage percentage) to the failure management system.

The base-station failure predictor may further comprise a failure rate calculator adapted to quantify a failure rate of the base-station. The failure rate of the base-station may be determined based upon the severity of the reported diagnostic indicators, the importance of the originating sub-units, a likelihood for subsequent failures, etc.

It would also be desirable to provide an improved base-station failure prediction method. This concern and/or possibly other concerns are addressed by a base-station failure prediction method comprising: receiving a current diagnostic indicator from at least one sub-unit of the base station, storing the current diagnostic indicator, analyzing the frequency of the current diagnostic indicator and of the previous diagnostic indicator to assess a likelihood of failure of the at least one sub-unit concerned. Reference is made to the explanations made above in connection with the base-station failure predictor for further details.

The method may further comprise analyzing the type of diagnostic indicator.

Alternatively, or in addition, the method may further comprise analyzing a combination of the diagnostic indicators to assess the likelihood of failure. The combinations of the diagnostic indicators may be a weighted combination used for providing an indication of the likelihood of failure within a given time period or an indication that the unit requires service or replacement prior to an actual failure.

The base-station failure prediction method may further comprise establishing a long-term trend in the diagnostic indicator(s).

The base-station failure prediction method may comprise quantizing a percentage of the base-station which is supervised by the base-station failure prediction method. The action of quantizing may comprise analyzing an origin (or several origins) of the diagnostic indicators and comparing the origin with a list of the sub-units to be supervised by the base-station failure prediction method.

The method may also comprise quantifying a failure rate of the base-station. The failure rate may reflect the number of the sub-units that have reported the diagnostic indicators, the severity of the diagnostic indicators, the importance of the originating sub-units, etc.

The present invention further provides a computer program product for a manufacture of the base-station failure predictor according to the teachings disclosed herein.

In yet another aspect the present invention provides a computer program product for carrying out the method according to the teachings disclosed herein.

DETAILED DESCRIPTION OF THE INVENTION

Figure 1:
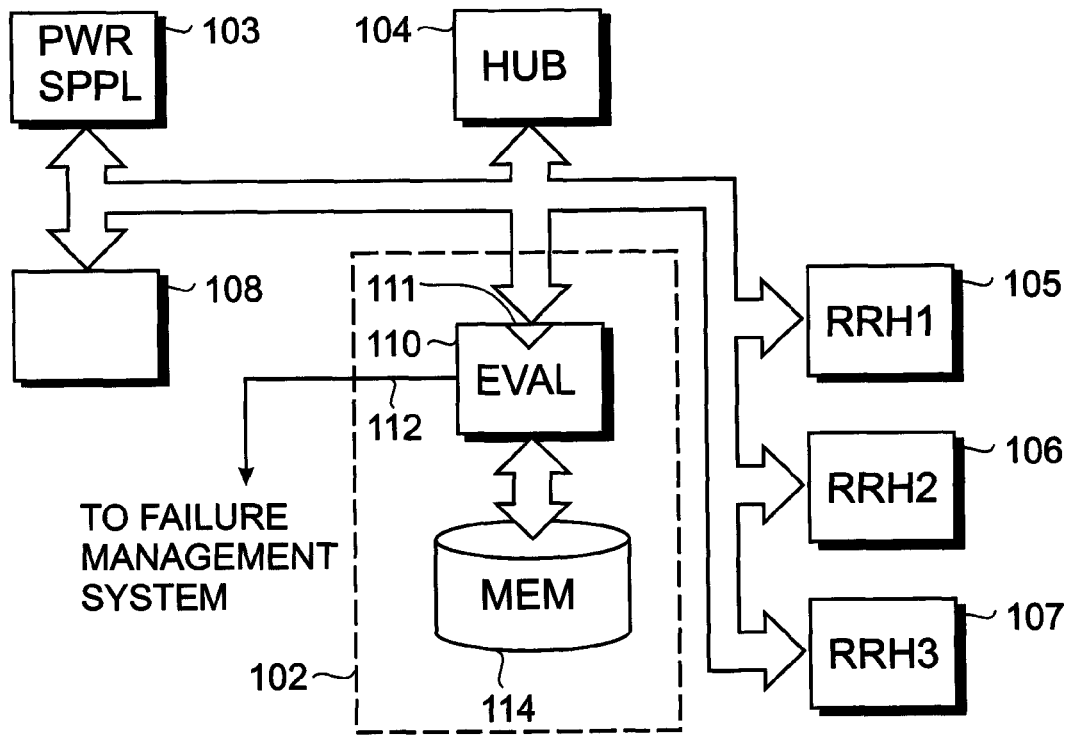
FIG. 1 shows the basic architecture of a base-station including a failure predictor.

The invention will now be described on the basis of the drawings. It will be understood that the embodiments and aspects of the invention described herein are only examples and do not limit the protective scope of the claims in any way. The invention is defined by the claims and their equivalents. It will also be understood that features of one aspect can be combined with a feature of different aspects. The base-station failure predictor as described herein may be implemented in hardware, in software, or as a combination of both without departing from the spirit of the invention.

The teachings disclosed herein are based on the idea of examining the frequency of minor diagnostic indicators, alarms and/or warnings (or combinations thereof). The examination is used to assess a likelihood of imminent failure. For example, an automated reset of a module or sub-unit would not typically be reported to the remainder of the base-station, if the automated reset had been successfully performed with no lasting effect upon sub-unit function or performance. It is only the failure of such a reset mechanism to re-start the module or the sub-unit, which is typically reported in prior art solutions.

This disclosure teaches that the frequency of such automated resets (and other similar events/warnings) be recorded (internally in the base-station, but potentially also externally, depending on the particular implementations). An increasing frequency of the automated resets may be used as an indicator of sub-unit degradation and hence likely, imminent, catastrophic failure. The indicator of sub-unit degradation may be of interest in combination with sub-units constituting a single point of failure. An example of the single point of failure is, without limitation, a central hub serving several remote radio heads. Likewise, combinations of the automated resets and/or other minor warnings and/or the diagnostic indicators could be an indication that a specific sub-unit is potentially problematic. For example, problems with a power supply unit (another single point of failure) could set off a number of the diagnostic indicators throughout the base-station and/or ones of the sub-units without necessarily failing outright (at least not immediately).

This disclosure further teaches the use of weighted ones of combinations of relevant measurements and/or the automated reset frequencies etc. yielding a combined metric or an overall 'health warning' for the sub-unit. For example, a reset in a critical single failure point sub-unit (such as the central hub) would be weighted higher than a reset in a partially-redundant unit (such as a radio head). Typically the base-station comprises more than one radio head. A failure of a single one of the radio heads would not cause the complete base-station to fail, whereas a failure in the central hub may well do so. Once this combined metric, which would yield a numeric value, rose above a given pre-determined threshold, then an diagnostic indicator would be sent to the base-station. Likewise, if a trend in the numeric value (whilst it remained below the warning threshold) was evident from the stored history of the numeric value, then a lower-level diagnostic indicator could be provided to indicate the recommended maximum interval before the next replacement/service was due.

FIG. 1 shows an exemplary architecture of a base-station as used in mobile communication networks. The base-station comprises several sub-units. The sub-units may comprise: a central hub 104, three radio heads 105, 106, 107, a power supply 103, and possibly some further sub-units 108 that may fulfill various functions. The base-station may comprise an antenna array which allows control of a beam shape and a direction of transmitted and/or received electromagnetic waves. Each of the three radio heads 105, 106, 107 may comprise or be linked to an antenna element in the antenna array. The number of three remote radio heads 105, 106, 107 has been chosen for illustrative purposes only and is not intended to limit the scope in any way. Typically the antenna arrays comprise 8, 16 or even more ones of the antenna elements. The signals transmitted by each one of the radio heads 105, 106, 107 are substantially the same. Differences between the signals transmitted by each one of the radio heads 105, 106, 107 may occur with respect to differences in phase and/or amplitude. A significant amount of signal processing may be performed in a central manner with the signal transmitted/received by the individual ones of the radio heads 105 106, 107 being substantially similar. Such signal processing is often performed by the central hub 104.

The base-station may further comprise a failure predictor 102 connected to at least some of the sub-units 105-108 of the base-station. The connection may be established by a bus, a point-to-point connection, a network or the like. Any diagnostic indicator detected by one of the sub-units 105-108 is communicated to the failure predictor 102 via the connection. The failure predictor 102 stores the communicated diagnostic indicators in a memory 114. The memory 114 could in fact be a shared memory that is also used by other components or sub-units 105-108 of the base-station. Based on the current diagnostic indicator(s) and the previously stored diagnostic indicators an diagnostic indicator evaluator 110 within the failure predictor 102 is adapted to estimate a probability for a failure within the sub-units 105-108 of the base station until the next scheduled service of the base-station. Alternatively, the failure predictor 102 may allow estimating a point in time, when a failure is most likely to occur in the future, as will be explained with respect to FIG. 3. The failure predictor 102 also comprises an output 112 connected, for example, to a failure management system of the base-station. The failure predictor 102 also comprises an interface 111 to the connection as defined above.

Figure 2:
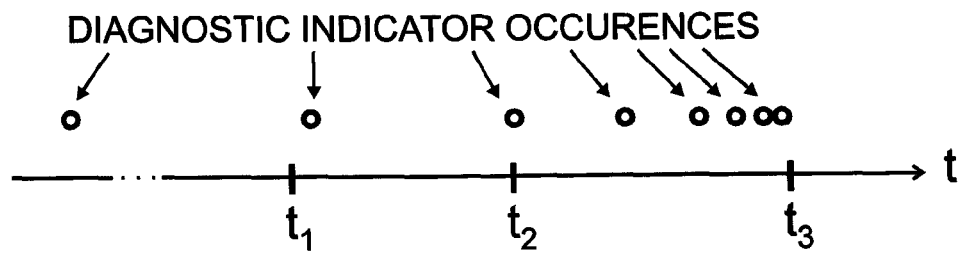
FIG. 2 shows a time diagram of occurrences of diagnostic indicators.

FIG. 2 shows a temporal diagram of diagnostic indicator occurrences of a particular type. FIG. 2 shows a decrease in a time between two diagnostic indicator occurrences. The leftmost diagnostic indicator occurred a relatively long time ago. At the instant $t_1$ a further diagnostic indicator occurred. The next diagnostic indicator occurs at the instant $t_2$. From there on, the interval between following diagnostic indicator occurrences is constantly decreasing up to an instant $t_3$. The failure predictor 102 may analyze the occurrences of failures and determine that there is probably an underlying, more severe problem connected with the occurrence of failures for the particular type of diagnostic indicator.

Figures 3, 4:
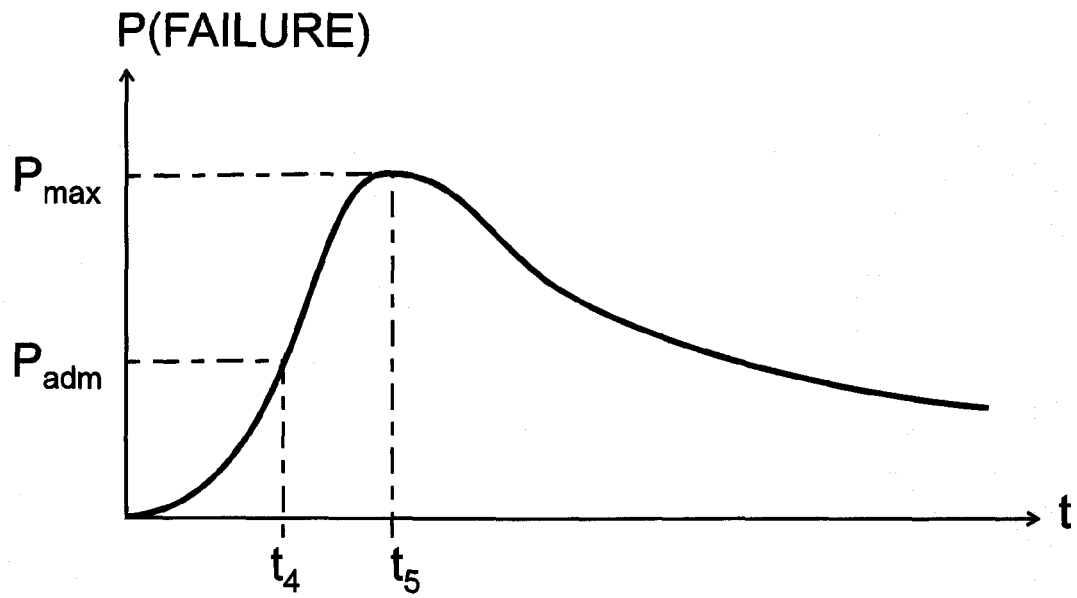
FIG. 3 shows a probability distribution for the likelihood of a certain failure.
FIG. 4 shows a structure for a storage structure for diagnostic indicator data.

FIG. 3 shows a probability graph illustrating the analysis performed by the failure predictor 102 at the time $t_3$. The failure predictor 102 can estimate when a failure of the sub-unit concerned is most likely to happen, based on the data collected by the failure predictor 102 as represented in FIG. 2. The probability distribution resembles a Poisson distribution. The graph has a maximum at $(t_5, P_{max})$, which means that a failure of the sub-unit is most likely to happen at the instant $t_5$. However, there is a non-vanishing likelihood for the sub-unit to fail prior to $t_5$, as represented by the graph of FIG. 3. The graph only represents a probability of failure, but gives no guarantee of failure. The graph may be considered an indication of a remaining life span of the sub-unit before failure.

The base-station operator may wish to allow for a certain margin of life span of the sub-unit for being most-likely able to replace the sub-unit before the sub-unit fails. The operator may define an admissible probability $P_{adm}$ in order to have this extra margin. As can be seen from FIG. 3, the probability distribution intersects the value $P_{adm}$ at the instant $t_4$. Accordingly, the operator should strive to schedule a service intervention prior to $t_4$.

FIG. 4 shows an example of information that may be stored about the diagnostic indicators in the memory 108. The diagnostic indicator is assigned an diagnostic indicator identification number ("ALARM ID") by the evaluator 110. The evaluator 110 also has access to or comprises a clock for adding a time stamp to a data record to be stored in the memory 108. Another entry in the data record pertains to the origin of the diagnostic indicator; i.e. the sub-unit issuing the diagnostic indicator. Furthermore, the data record also comprises a field for the type of the diagnostic indicator.

The illustrative example shown in FIG. 4 reveals that an diagnostic indicator issued by the remote radio head (RRH1) pertaining to intermodulation distortion (IMD) problems occurred at 7.32 AM. The same type of diagnostic indicator occurred again at 7.57 AM, i.e. 25 minutes later. At 8.06 AM another type of diagnostic indicator is reported from the power supply (PSR) informing the evaluator, that the power supply 103 might have a heat-related problem. A further diagnostic indicator is received at 8.14 AM, again from the remote radio head 1 (RRH1) and again related to intermodulation distortion problems (IMD). The elapsed time between diagnostic indicator number 1233 and diagnostic indicator number 1235 is 17 minutes, which might be an indicator for persistent and aggravating problems within remote radio head number 1.

Figure 5:
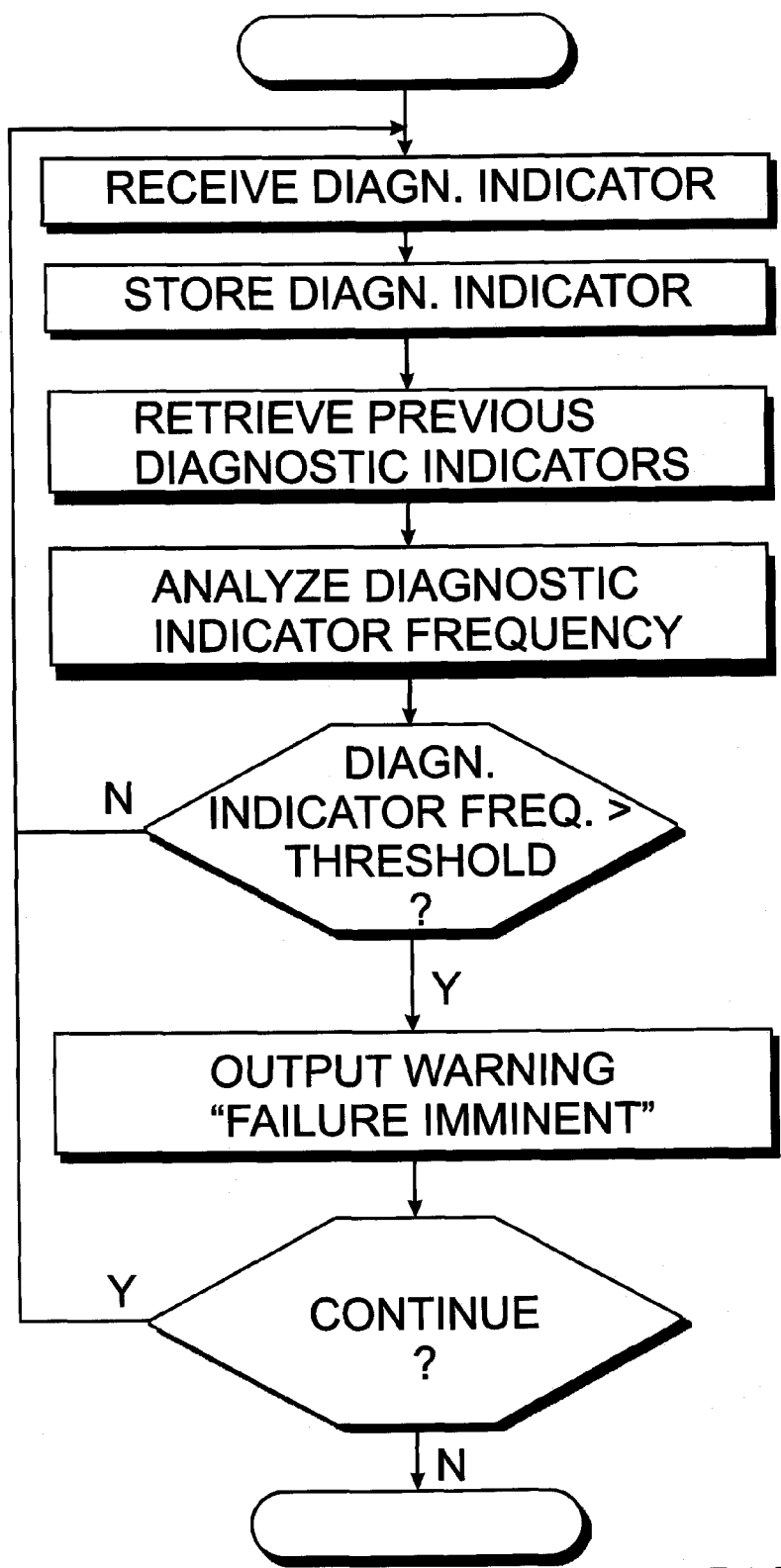
FIG. 5 shows a flowchart of a failure prediction method.

FIG. 5 shows a flowchart of an exemplary base-station failure prediction method. After the start of the method, the monitor 102 is ready to receive diagnostic indicators from the various ones of the sub-units of the base-station. When an diagnostic indicator is received, the monitor stores the diagnostic indicator, for example in the memory 108. If available, previously stored ones of the diagnostic indicators are retrieved in order to detect recurring patterns or to determine characteristic properties within the previously stored diagnostic indicators and the current diagnostic indicator. In the alternative, or in addition, the diagnostic indicators may be examined based on different strategies and for different purposes.

In another action of the method, the diagnostic indicator frequency is analyzed. This may be done by measuring the time between two diagnostic indicators of the same type and origin and by verifying whether a significant change in these time differences can be observed. If the diagnostic indicator frequency is greater than a certain threshold, a warning is issued that a failure is imminent. If the diagnostic indicator frequency is less than the threshold, the method loops back and is ready to receive further ones of the diagnostic indicators from the sub-units. The threshold may be predefined or the threshold may be constantly adapted on the basis of the history of this type of diagnostic indicator. It is also possible to define two or more thresholds. A first threshold is set to indicate the absolute boundary of safe operation. The other threshold may be variable for an earlier identification of trends.

With reference to the action where the warning "failure imminent" is output, it is determined in a subsequent action whether the method should be continued or not. If yes, the method loops back to the state in which the method is ready to receive diagnostic indicators from the sub-units. If the method should not be continued, the method ends.

Figure 6:
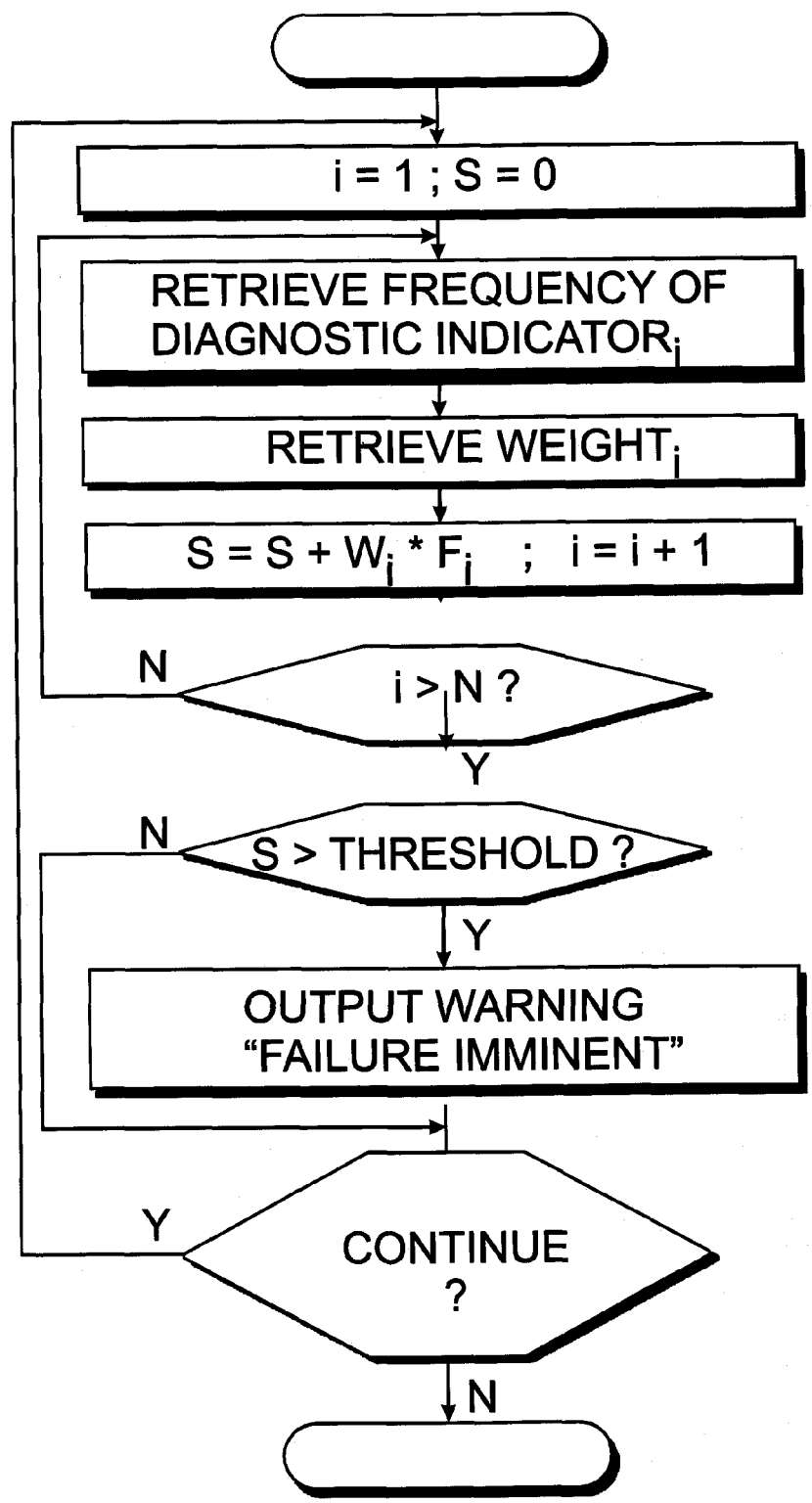
FIG. 6 shows another flowchart relative to the determination of a weighted sum.

FIG. 6 shows a flow chart of a method for calculating a weighted combination or weighted sum and for issuing a warning based on a calculated numeric value of the weighted sum. After the start of the method two local variables i and S are initialised. The variable i is an index and is initialized to the value 1. The variable S is used to store intermediate results of the numeric value of the weighted sum. The variable S is initialized to 0. In the next action a loop is started. A frequency $F_i$ of a diagnostic indicator indexed with the current value of i is retrieved. The frequency can be the number of occurrences during a certain period of time, for example one hour or one day, divided by the duration of said period of time. In another action a weight $W_i$ is retrieved. The weights $W_i$ may be predetermined and stored in a database or a memory. When the frequency $F_i$ and the weight $W_i$ have been retrieved, the intermediate result of the numeric value of the weighted sum is updated: $S=S+W_i*F_i$. The index i is increased by one. At a decision point the method checks whether the end of the loop has been reached. The variable N is the number of diagnostic indicators that are to be included in the weighted sum. The loop continues with at least one more iteration if the index i is smaller than or equal to N. The method exits the loop if i>N. At a subsequent decision point it is determined whether the numeric value of the weighted sum exceeds a certain threshold. A warning "Failure imminent" is issued if the numeric value of the weighted sum exceeds the threshold. Otherwise, the method skips the action of issuing a warning. A last decision point is intended for the method to determine whether the calculation of a numeric value for the weighted sum should be continued. The method loops back to the initialization of the variable i and S to start a new iteration, if the calculation of the numeric value for the weighted sum should be continued. The method ends, if the calculation should not be continued.

Figure 7:
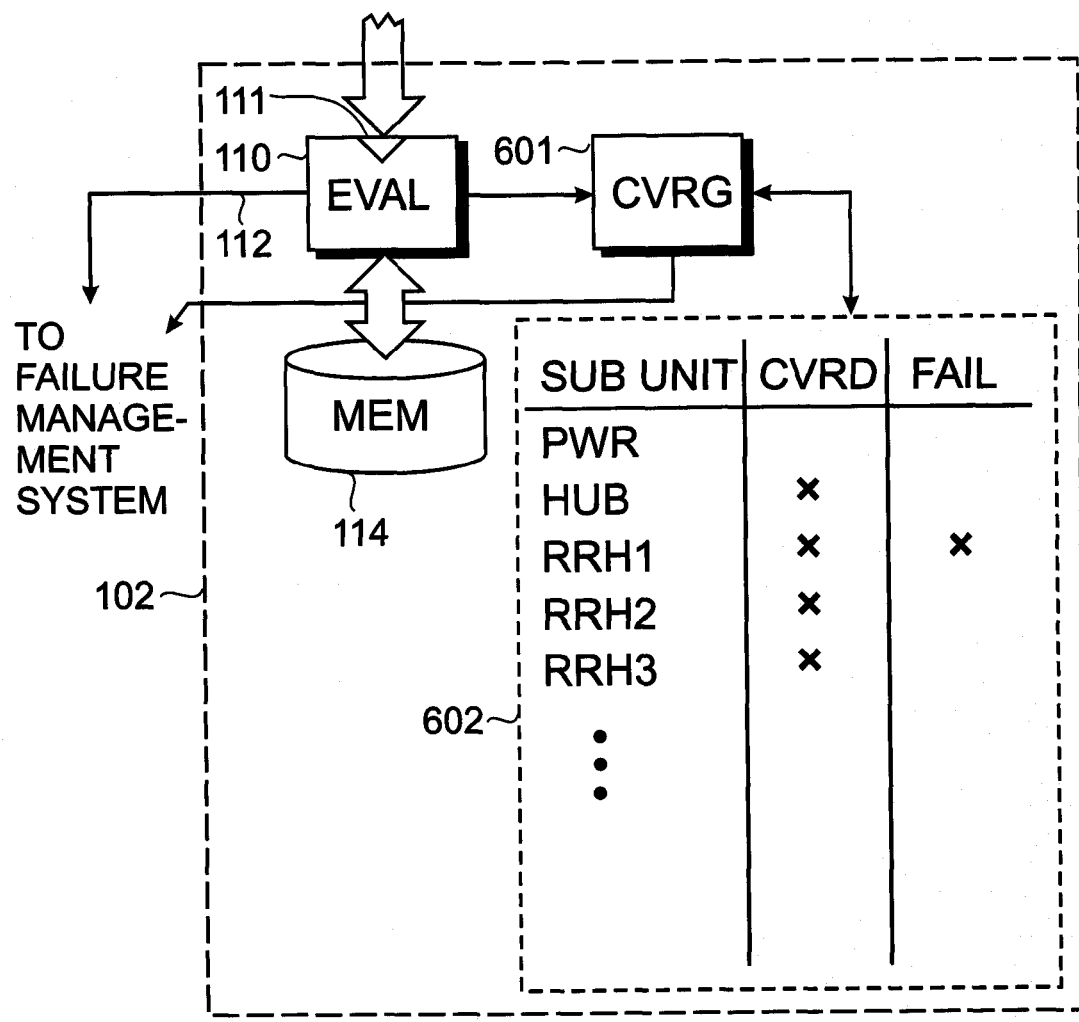
FIG. 7 shows a base-station failure predictor with additional aspects.

FIG. 7 shows a base-station failure predictor having a coverage assessment capability. The base-station failure predictor 102 comprises a combined coverage assessment module and failure rate calculator 601 (CVRG). The coverage assessment module and the failure rate calculator need not be combined, but could also be separate. It is also possible that only one of the coverage assessment module and the failure rate calculator is present in the base-station failure predictor. The combined overage assessment module and failure rate calculator 601 maintains a list or table that contains the sub-units to be supervised by the base-station failure predictor. In FIG. 6 the list contains the exemplary entries: "PWR" for power supply, "HUB" for a central signal processing hub, "RRH1" to "RRH3" for remote radio heads 1 to 3. The list is non-exhaustive and might contain a number of further ones of the sub-units. The centre column of the list or table has the title "CVRD" for "covered" indicates whether the sub-unit in question is covered by the base-station failure predictor 102. As can be seen, the power supply is not covered by the base-station failure predictor 102. This may be, because the power supply does not support reporting diagnostic indicators to a central failure management system. The right column of the list or table has the title "FAIL" and indicates whether a certain one of the sub-units has reported a failure so far. In the case illustrated in FIG. 6 the remote radio head 1 (RRH1) has reported a failure. The calculated values for the coverage percentage and the failure percentage may be reported to the failure management system.

Another aspect of the teachings disclosed herein relates to the use of fault level analysis to provide more specific metrics for the weighting of the diagnostic indicators and the warnings. For example, if an amplifier temperature warning is detected several times, a fault level analysis may be able provide specific information as to the number of devices and interfaces in the base-station impacted by such an diagnostic indicator. If then a PLL lock diagnostic indicator was detected, the fault level analysis may provide details regarding if these two warnings or diagnostic indicators were possibly related or simply independent events.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a computer usable (e.g. readable) medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known computer usable medium such as semiconductor, magnetic disc, or optical disc (e.g., CD-ROM, DVD-ROM, etc.). The software can also be disposed as a computer data signal embodied in a computer usable (e.g. readable) transmission medium (e.g., carrier wave or any other medium including digital, optical, analogue-based medium). Embodiments of the present invention may include methods of providing the apparatus described herein by providing software describing the apparatus and subsequently transmitting the software as a computer data signal over a communication network including the internet and intranets.

It is understood that the apparatus and method describe herein may be included in a semiconductor intellectual property core, such as a micro processor core (e.g., embodied in HDL) and transformed to hardware in the production of integrated sequels. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A base-station failure predictor, comprising
an interface to at least one sub-unit of the base-station,
a diagnostic indicator memory, and
a diagnostic indicator evaluator,
wherein the base-station failure predictor is adapted to receive a plurality of diagnostic indicators from the at least one sub-unit of the base-station via the interface, wherein the plurality of diagnostic indicators are stored in the diagnostic indicator memory, and wherein the diagnostic indicator evaluator is adapted to analyze a time of clustered occurrence and a type of each one of the plurality of diagnostic indicators to assess a likelihood of failure of the at least one sub-unit concerned.

2. The base-station failure predictor according to claim 1, wherein the diagnostic indicator evaluator is adapted to analyze correlations of diagnostic indicators to assess the likelihood of failure of the at least one sub-unit concerned.

3. The base-station failure predictor according to claim 2, wherein the combination of diagnostic indicators is a weighted combination, and wherein the diagnostic indicator evaluator is adapted to use the weighted combination for providing an indication of the likelihood of failure within a given period in time or an indication that the unit requires service or replacement prior to an actual failure.

4. The base-station failure predictor according to claim 1, wherein the diagnostic indicator evaluator is adapted to establish a long-term trend in the diagnostic indicators of the at least one sub-unit concerned.

5. The base-station failure predictor according to claim 1, further comprising a coverage assessment module adapted to quantize a percentage of sub-units of the base-station which are supervised by the base-station failure predictor.

6. The base-station failure predictor according to claim 5, wherein the coverage assessment module is adapted to analyze the origin of the diagnostic indicators and to compare the origin of the diagnostic indicators with a list of sub-units to be supervised by the base-station failure predictor.

7. The base-station failure predictor according to claim 5, wherein the coverage assessment module determines the ratio between the number of the sub-units that are actually cooperating and the number of the sub-units to be monitored.

8. The base-station failure predictor according to claim 1, wherein the diagnostic indicators reported via the sub-units may have different levels of severity, ranging from minor problems that should be attended to during the next scheduled maintenance, to highly severe failures that may cause the sub-unit to cease operation.

9. The base-station failure predictor according to claim 1, wherein a failure rate calculator is adapted to quantify a failure rate of the base-station based upon the severity of the reported diagnostic indicators of the at least one sub-unit or the importance of the originating sub-units.

10. A computer program product embodied on a non-transitory computer-readable medium and the non-transitory computer-readable medium comprising executable instructions for the manufacture of a base-station failure predictor comprising an interface to at least one sub-unit of the base-station, a diagnostic indicator memory, and an diagnostic indicator evaluator, wherein the base-station failure predictor is adapted to receive a plurality of diagnostic indicators from the at least one sub-unit of the base-station via the interface, wherein the plurality of diagnostic indicators are stored in the diagnostic indicator memory, and wherein the diagnostic indicator evaluator is adapted to analyze a time of clustered occurrence and a type of each one of the plurality of diagnostic indicators to assess a likelihood of failure of the at least one sub-unit concerned.

* * * * *